(12) United States Patent
Bao et al.

(10) Patent No.: US 12,366,629 B2
(45) Date of Patent: Jul. 22, 2025

(54) ASSISTANCE INFORMATION FOR SIDELINK-ASSISTED POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

(21) Appl. No.: 17/463,105

(22) Filed: Aug. 31, 2021

(65) Prior Publication Data

US 2022/0065979 A1     Mar. 3, 2022

Related U.S. Application Data

(60) Provisional application No. 63/073,848, filed on Sep. 2, 2020.

(51) Int. Cl.
*G01S 5/02* (2010.01)
*G01S 5/12* (2006.01)

(52) U.S. Cl.
CPC ........ *G01S 5/0236* (2013.01); *G01S 5/02216* (2020.05); *G01S 5/0246* (2020.05); *G01S 5/0289* (2013.01); *G01S 5/12* (2013.01)

(58) Field of Classification Search
None
See application file for complete search history.

(56) References Cited

U.S. PATENT DOCUMENTS

| | | | |
|---|---|---|---|
| 2002/0107029 A1* | 8/2002 | Caughran | H04W 4/02 455/456.1 |
| 2015/0123844 A1* | 5/2015 | Farmer | H04W 56/0035 342/357.51 |
| 2016/0095080 A1* | 3/2016 | Khoryaev | G01S 5/0284 455/456.1 |
| 2019/0230618 A1* | 7/2019 | Saur | H04W 56/001 |
| 2019/0297673 A1 | 9/2019 | Xue et al. | |

FOREIGN PATENT DOCUMENTS

CN      110536234 A      12/2019

OTHER PUBLICATIONS

International Search Report and Written Opinion—PCT/US2021/048614—ISA/EPO—Dec. 8, 2021.
Taiwan Search Report—TW110132445—TIPO—Feb. 27, 2025.

* cited by examiner

*Primary Examiner* — Jinsong Hu
*Assistant Examiner* — Alexander J Yi
(74) *Attorney, Agent, or Firm* — Thien T. Nguyen

(57) ABSTRACT

According to embodiments herein, assistance data may be provided to a UE regarding an anchor UE that provides a reference signal via the SL interface to the UE. Assistance data may include information indicative of the coordinates, height, drift rate, beam characteristics, group delay, and/or other aspects of the anchor UE. The assistance data may be provided to the UE by a location server, a base station, or directly from the anchor UE.

28 Claims, 10 Drawing Sheets

ASSISTANCE INFORMATION FOR SIDELINK-ASSISTED POSITIONING

RELATED APPLICATIONS

This application claims the benefit of U.S. Provisional Application No. 63/073,848, filed Sep. 2, 2020, entitled "ASSISTANCE INFORMATION FOR SIDELINK-ASSISTED POSITIONING", which is assigned to the assignee hereof, and incorporated herein in its entirety by reference.

BACKGROUND

1. Field of Invention

The present invention relates generally to the field of wireless communications, and more specifically to determining the location of a User Equipment (UE) using radio frequency (RF) signals.

2. Description of Related Art

The use of a sidelink (SL) interface in the positioning of a UE for which a position is to be determined (or "target UE") may be similar in ways to the use of base stations. However, specific details information provided via the SL interface and assistance data for positioning using the SL interface are yet undetermined. There are no definitions for SL-based assisted measurements in Long-Term Evolution (LTE) Positioning Protocol (LPP) reporting.

BRIEF SUMMARY

According to embodiments herein, assistance data may be provided to a target UE regarding an anchor UE that provides a reference signal via the SL interface to the UE. Assistance data may include information indicative of the coordinates, height, drift rate, beam characteristics, group delay, and/or other aspects of the anchor UE. The assistance data may be provided to the UE by a location server, a base station, or directly from the anchor UE.

An example method of determining a location of a first user equipment (UE) using assistance data related to a second UE, according to this disclosure, may comprise obtaining assistance data related to determining the location of the first UE using a sidelink (SL) interface between the first UE and the second UE. The method also may comprise conducting a positioning operation at the first UE based at least in part on the assistance data, wherein the positioning operation comprises: transmitting a first positioning signal by the first UE via the SL interface, or performing, at the first UE, a measurement of a second positioning signal transmitted by the second UE via the SL interface.

An example first user equipment (UE) for determining a location of the first UE a using assistance data related to a second UE, according to this disclosure, may comprise a transceiver, a memory, one or more processors communicatively coupled with the transceiver and the memory, wherein the one or more processors are configured to obtain the assistance data related to determining the location of the first UE using a sidelink (SL) interface between the first UE and the second UE. The one or more processors further may be configured to conduct a positioning operation at the first UE based at least in part on the assistance data, wherein the positioning operation comprises: transmitting, with the transceiver, a first positioning signal by the first UE via the SL interface, or performing, with the transceiver, a measurement of a second positioning signal transmitted by the second UE via the SL interface.

An example apparatus for determining a location of a first user equipment (UE) using assistance data related to a second UE, according to this disclosure, may comprise means for obtaining assistance data related to determining the location of the first UE using a sidelink (SL) interface between the first UE and the second UE. The apparatus further may comprise means for conducting a positioning operation at the first UE based at least in part on the assistance data, wherein the positioning operation comprises: means for transmitting a first positioning signal by the first UE via the SL interface, or means for performing, at the first UE, a measurement of a second positioning signal transmitted by the second UE via the SL interface.

According to this disclosure, an example non-transitory computer-readable medium stores instructions for determining a location of a first user equipment (UE) using assistance data related to a second UE, the instructions comprising code for obtaining assistance data related to determining the location of the first UE using a sidelink (SL) interface between the first UE and the second UE. The instructions further may comprise code for conducting a positioning operation at the first UE based at least in part on the assistance data, wherein the positioning operation comprises: transmitting a first positioning signal by the first UE via the SL interface, or performing, at the first UE, a measurement of a second positioning signal transmitted by the second UE via the SL interface.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
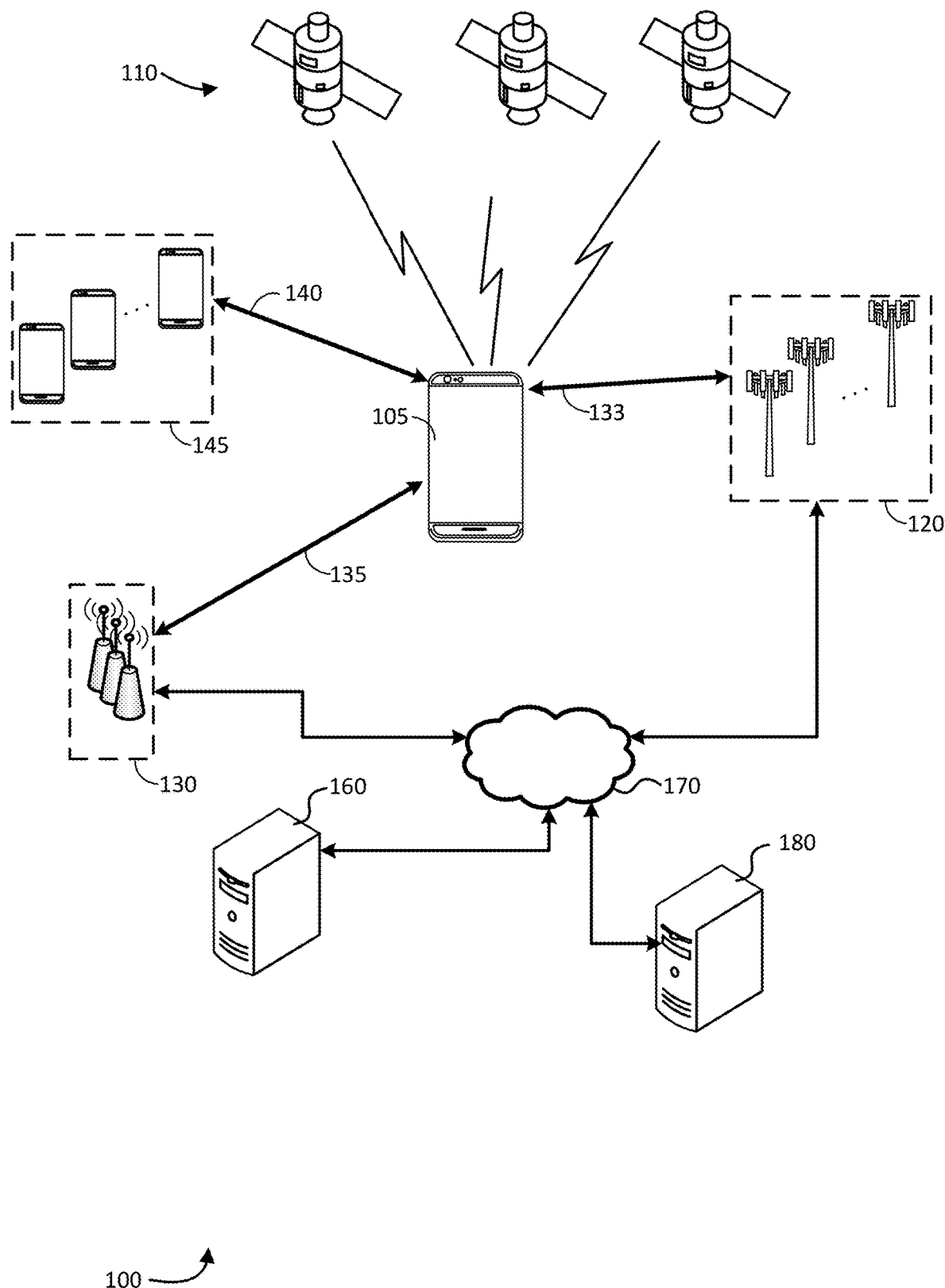
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

FIG. 1 is a simplified illustration of a positioning system 100 in which a UE 105, location server 160, and/or other components of the positioning system 100 can use the techniques provided herein for determining and estimated location of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence)

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
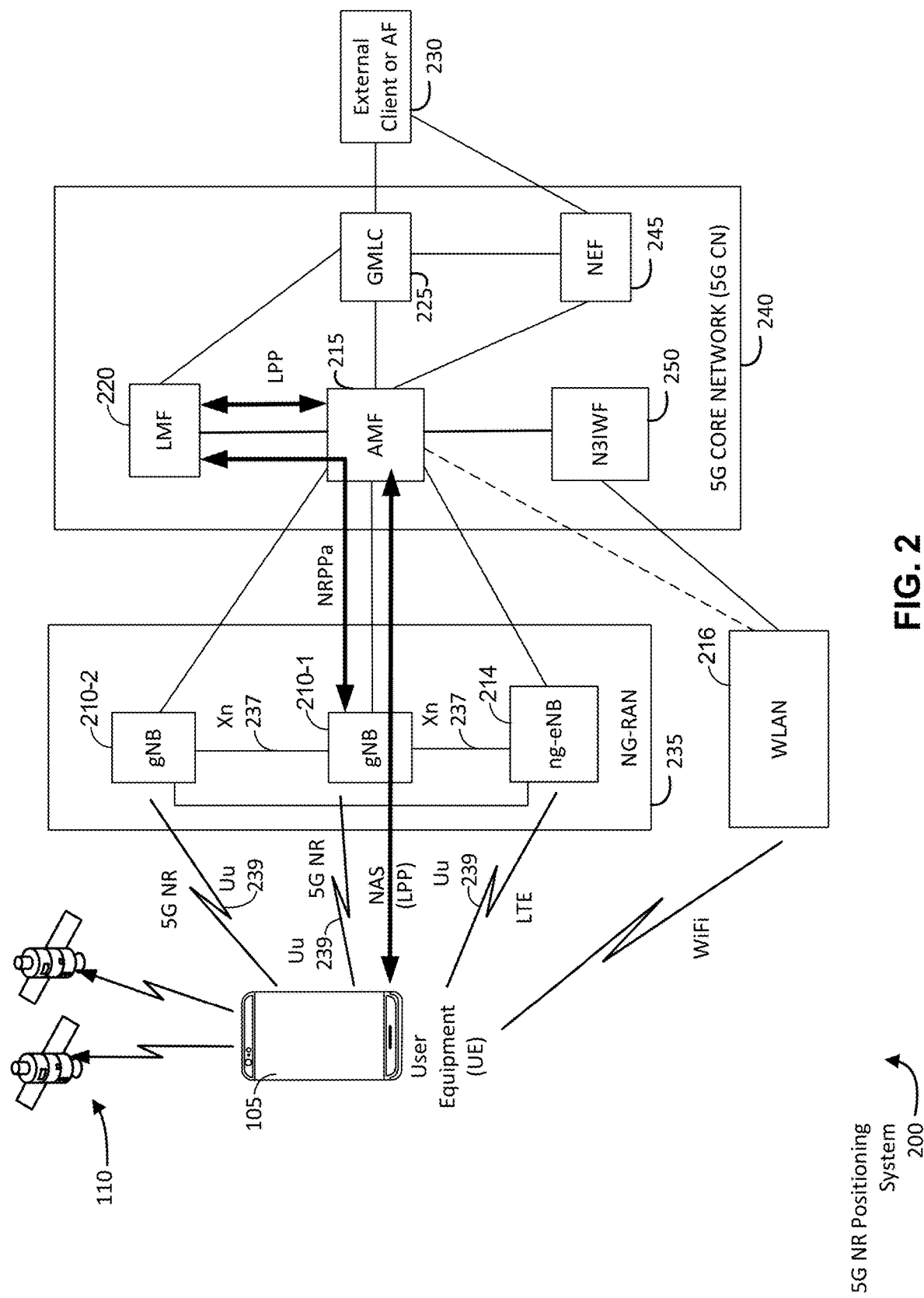
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF) s 215, external clients 230, and/or other components. The illustrated connections that connect the various components in the 5G NR positioning system 200 include data and signaling connections which may include additional (intermediary) components, direct or indirect physical and/or wireless connections, and/or additional substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., PRS) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Figure 4:
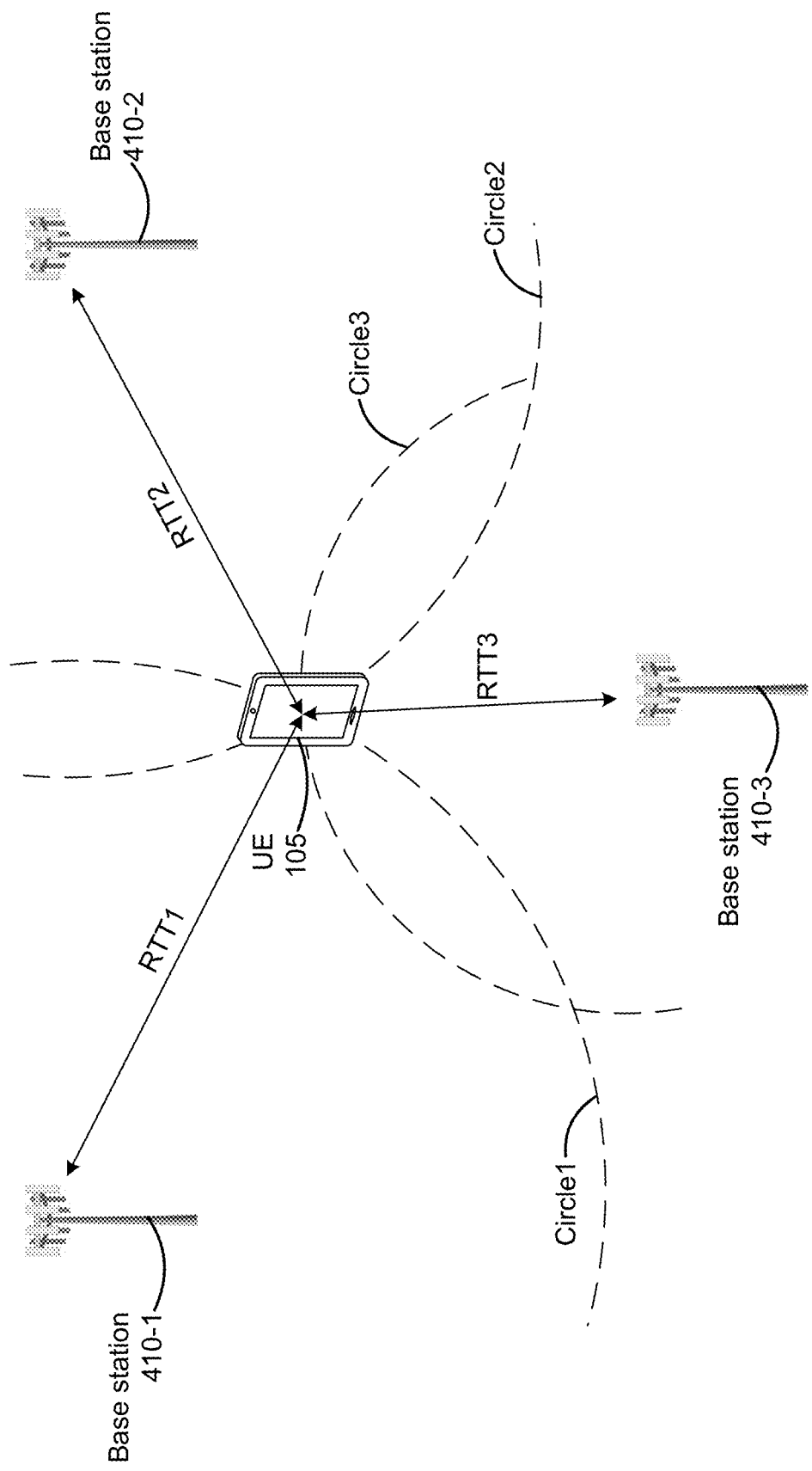
Figure 5:
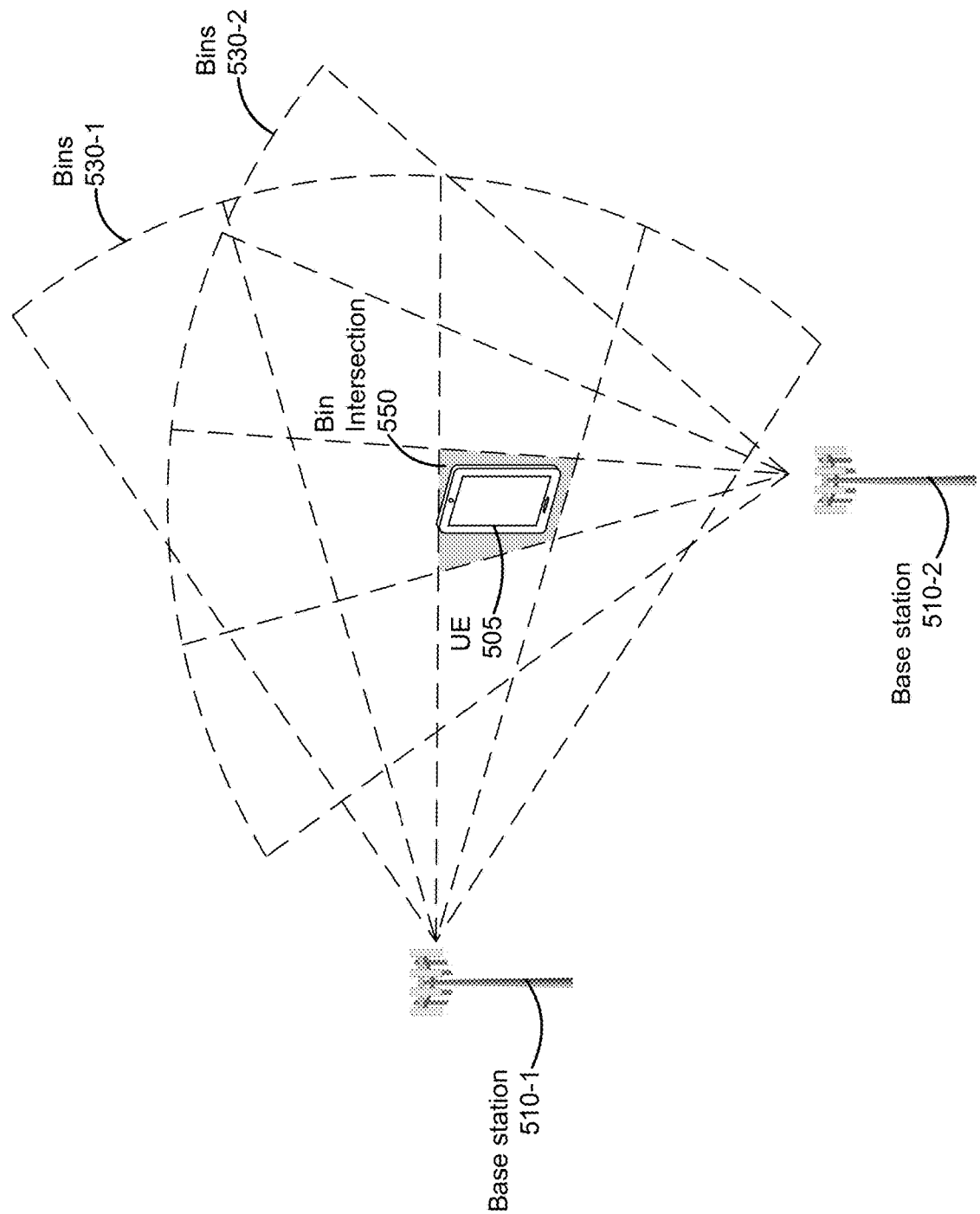

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD. Examples of how PRS (and/or other RF signals) can be used for OTDOA, AoD, and RTT-based positioning are described hereafter in relation to FIGS. 3-5. It can be noted that, although examples shown in FIGS. 3-5 illustrate and discuss base stations (which may correspond to gNBs 210 and/or ng-eNB 214 of FIG. 2 and/or base stations 120 of FIG. 1), positioning techniques may use specific TRPs of base stations to provide accurate positioning.

Figure 3:
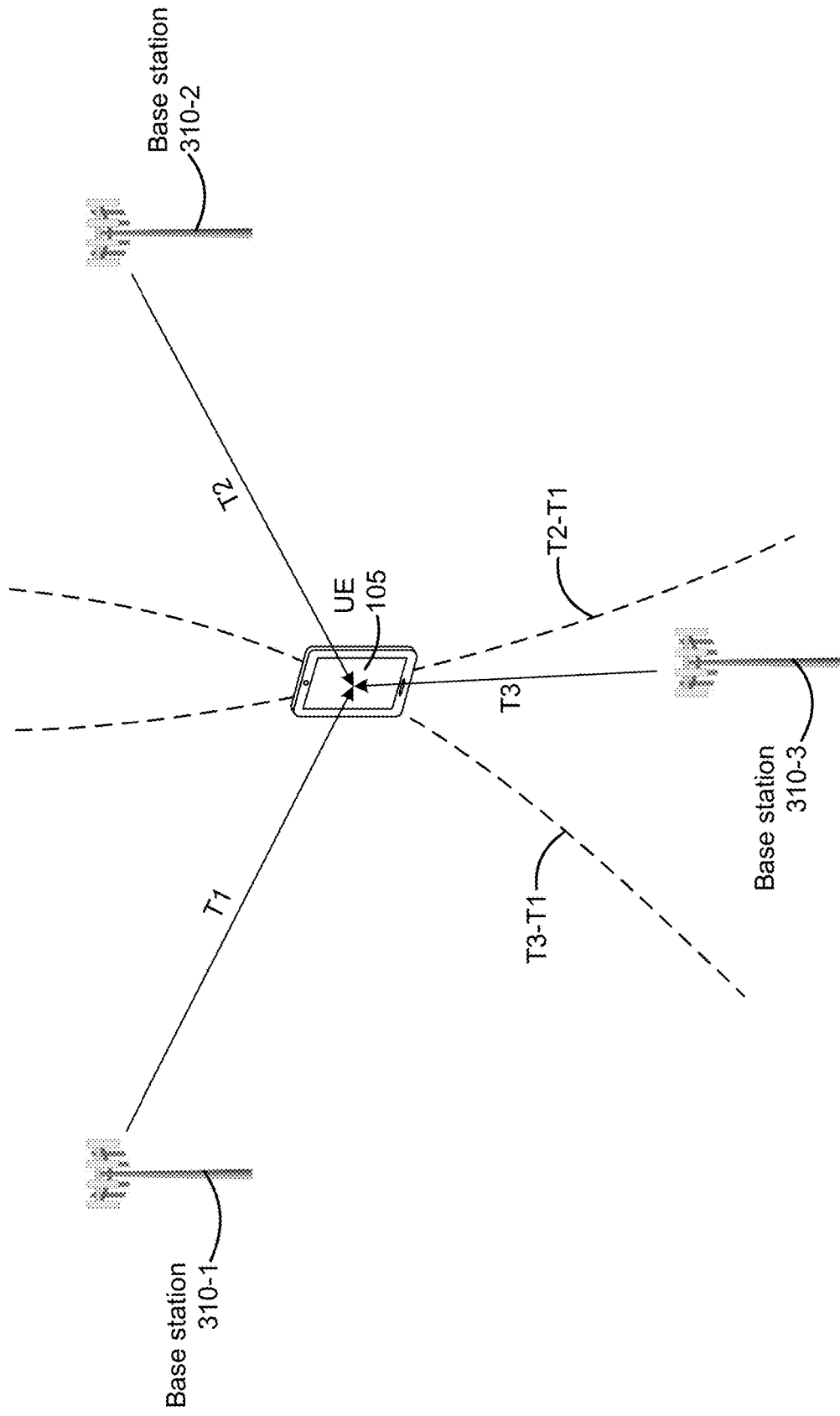
FIGS. 3-5 are illustrations of different types of positioning methods used to determine the location of a UE.

FIG. 3 is an illustration how OTDOA-based positioning (also known as downlink time difference of arrival (DL-TDOA)) can be made, according to some embodiments. In brief, OTDOA-based positioning is positioning made based on known positions of base stations (e.g., base stations 310-1, 310-2, and 310-3, collectively and generically referred to herein as base stations 310), known times at which base stations transmit respective reference signals (e.g., PRS), and differences in times at which the UE 105 receives the reference signals from each base station.

In OTDOA-based positioning, a location server may provide OTDOA assistance data to a UE P105 for a reference base station (which may be called a "reference cell" or "reference resource"), and one or more neighboring base stations (which may be called "neighbor cells" or "neighboring cells", and which individually may be called a "target cell" or "target resource") relative to the reference base station. For example, the assistance data may provide the center channel frequency of each base station, various PRS configuration parameters (e.g., $N_{PRS}$, $T_{PRS}$, muting sequence, frequency hopping sequence, PRS ID, PRS bandwidth), a base station (cell) global ID, PRS signal characteristics associated with a directional PRS, and/or other base station related parameters applicable to OTDOA or some other position method. OTDOA-based positioning by a UE 105 may be facilitated by indicating the serving base station for the UE 105 in the OTDOA assistance data (e.g., with the reference base station indicated as being the serving base station). In some aspects, OTDOA assistance data may also include "expected Reference Signal Time Difference (RSTD)" parameters, which provide the UE 105 with information about the RSTD values the UE 105 is expected to measure at its current location between the reference base station and each neighbor base station, together with an uncertainty of the expected RSTD parameter. The expected RSTD, together with the associated uncertainty, may define a search window for the UE 105 within which the UE 105 is expected to measure the RSTD value. OTDOA assistance information may also include PRS configuration information parameters, which allow a UE 105 to determine when a PRS positioning occasion occurs on signals received from various neighbor base stations relative to PRS positioning occasions for the reference base station, and to determine the PRS sequence transmitted from various base stations in order to measure a TOA or RSTD. TOA measurements may be RSRP (Reference Signal Receive Power) measurements of average power of Resource Elements (RE) that carry PRS (or other reference signals).

Using the RSTD measurements, the known absolute or relative transmission timing of each base station, and the known position(s) of wireless node physical transmitting antennas for the reference and neighboring base stations, the UE position may be calculated (e.g., by the UE 105 or by a location server). More particularly, the RSTD for a neighbor base station "k" relative to a reference base station "Ref," may be given as the difference in TOA measurements of signals from each base station (i.e., TOAk-TOARef), where the TOA values may be measured modulo one subframe duration (1 ms) to remove the effects of measuring different subframes at different times. In FIG. 3, for example, a first base station 310-1 may be designated as the reference base station, and second and third base stations (P110-2 and 310-3) are neighbor base stations. If UE 105 receives reference signals from first base station 310-1, second base station 310-2, and third base station 310-3 at times T1, T2, and T2, respectively, then the RSTD measurement for second base station 310-2 would be determined as T2-T1 and the RSTD measurement for third base station 310-3 would be determined as T3-T1. RSTD measurements can be used by the UE 105 and/or sent to a location server to determine the location of the UE 105 using (i) the RSTD measurements, (ii) the known absolute or relative transmission timing of each base station, (iii) the known position(s) of base stations 310 for the reference and neighboring base stations, and/or (iv) directional PRS characteristics such as a direction of transmission. Geometrically, information (i)-(iv) allows for possible locations of the UE 105 to be determined for each RSTD (where each RSTD results in a hyperbola, as shown in FIG. 3), and the position of the UE 105 to be determined from the intersection of the possible locations for all RSTDs.

FIG. 4 is an illustration how RTT-based positioning (or multi-RTT) can be made, according to some embodiments. In brief, RTT-based positioning includes positioning methods in which the position of the UE 105 is determined based on known positions of base stations (e.g., base stations 410, which again may correspond to gNBs 210 and/or ng-eNB 214 of FIG. 2), and known distances between the UE 105 and the base stations. RTT measurements between the UE 105 and each base station are used to determine a distance between the UE 105 and the respective base station, and multilateration can be used to determine the location of the UE 105.

In RTT-based positioning, a location server may coordinate RTT measurements between the UE 105 and each base station. Information provided to the UE 105 may be included in RTT assistance data. This can include, for example, reference signal (e.g., PRS) timing and other signal characteristics, base station (cell) ID, and/or other cell related parameters applicable to multi-RTT or some other position method. Depending on desired functionality, RTT measurements may be made (and initiated by) the UE 105 or a base station 410.

RTT measurements measure distance using Over The Air (OTA) delay. An initiating device (e.g., the UE 105 or a base station 410) transmits a first reference signal at first time, T1, which propagates to a responding device. At a second time, T2, the first reference signal arrives at the responding device. The OTA delay (i.e., the propagation time it takes for the first reference signal to travel from the initiating device to the responding device) is the difference between T1 and T2. The responding device then transmits a second reference signal at a third time, T3, and the second reference signal is received and measured by the initiating device at a fourth time, T4. RSRP measurements may be used to determine TOA for times T2 and T4. Distance, d, between the initiating and responding devices therefore can be determined using the following equation:

$$\frac{2d}{c} = (T_4 - T_1) - (T_3 - T_2) = (T_4 - T_1) + (T_2 - T_3). \quad (1)$$

(As will be appreciated, distance, d, divided by the speed of RF propagation, c, equals the OTA delay.) Thus, a precise determination of the distance between the initiating device and responding device can be made.

RTT measurements between the UE 105 and base stations 410 can therefore allow the position of the UE 105 to be determined using multilateration. That is, RTT measurements between the UE 105 and the first base station 410-1, second base station 210-2, and third base station 410-3 (RTT measurements RTT1, RTT2, and RTT3, respectively) result in a determination of the distance of the UE 105 from each of the base stations 410. These distances can be used to trace circles around known positions of the base stations 410 (where Circle1 corresponds to base station 410-1, Circle2 corresponds to base station 410-2, and Circle3 corresponds to base station 410-3.) The position of the UE 105 can be determined as the intersection between the circles.

FIG. 5 is an illustration how AoD-based positioning (or DL-AoD) can be made, according to some embodiments. In brief, AoD-based positioning is positioning made based on reference signals (e.g., PRS) received by the UE 505, transmitted by certain beams of the base stations 510, and a corresponding coverage area covered by the beams.

In AoD-based positioning, a location server may provide AoD assistance data to a UE 505. This assistance data, which may be based on an approximate location of the UE 505, may provide information regarding reference signals for nearby base stations 510, including center channel frequency of each base station, various PRS configuration parameters (e.g., $N_{PRS}$, $T_{PRS}$, muting sequence, frequency hopping sequence, PRS ID, PRS bandwidth, beam ID), a base station (cell) global ID, PRS signal characteristics associated with a directional PRS, and/or other base station related parameters applicable to AoD or some other position method.

Using this information, the UE 505 and/or location server can determine the UE's location by the beam(s) with which the UE 505 detects a PRS from each base station 510. More specifically, a PRS from a base station 510 is transmitted via a beam centered along angular regions, or bins 530. Thus, each bin can correspond to a PRS from a different respective beam. Bins 530 from different base stations 510 can form an angular grid that can be used to determine the location of the UE 505. For example, as illustrated in FIG. 3, bins 530-1 of base station 510-1 intersect with bins 530-2 of base station 510-2 to form an angular grid. The UE 505 can measure (e.g., using RSRP measurements) the PRS of different beams of each base station 510. These measurements can be used by the UE 505 or sent to the location server to determine the location of the UE 505 from the corresponding bin intersection 550, where the bin 530-1 corresponding to the PRS of a first base station 510-1 intersects with the bin 530-2 corresponding to the PRS of a second base station 510-2. Similar measurements can be made from additional base stations (not shown) to provide additional accuracy. Additionally or alternatively, measurements from multiple beams of a single base station 510 can enable interpolation for higher-resolution positioning.

Figure 6:
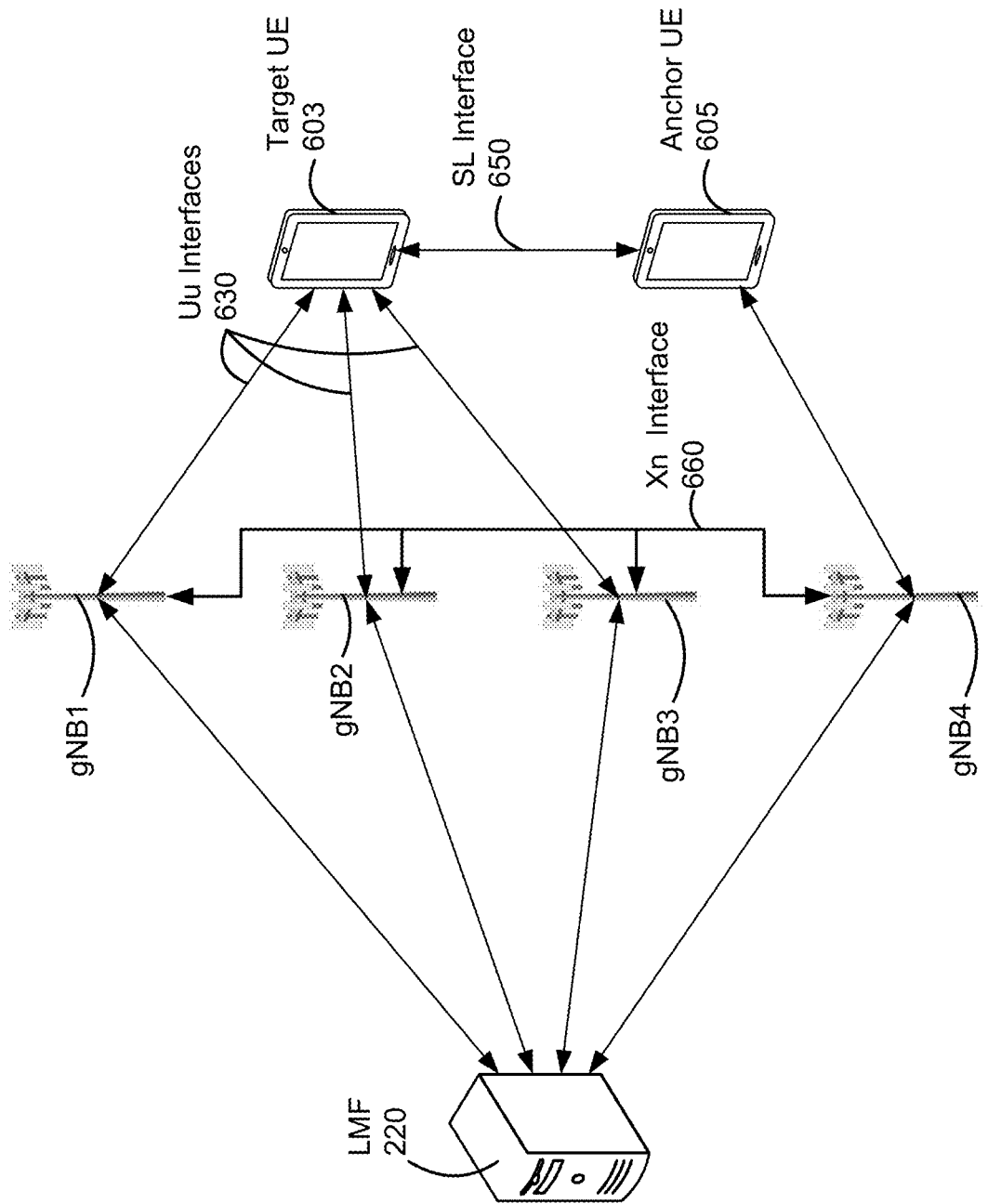
FIG. 6 is a simplified diagram illustrating how an anchor UE can be used in the positioning of a UE in a 5G NR network, according to an embodiment.

Although the positioning methods in FIGS. 3-5 traditionally use base stations (as shown) as anchor points by which to determine the position of target UE 603, 5G NR is developing the possibility of using other UEs as anchor points in addition or as an alternative to base stations, as previously indicated with regard to UEs 145 of FIG. 1. FIG. 6 provides a more detailed example.

FIG. 6 is a simplified diagram illustrating how an anchor UE 605 can be used in the positioning of a target UE 603 in a 5G NR network, according to an embodiment. Here, arrows between the various components illustrate communication links. As illustrated in FIG. 2, this may involve wireless and/or wired communication technologies and may include one or more intermediary components. For simplicity, gNBs (e.g., corresponding to gNBs 210 of FIG. 2) are simply labeled gNB1-gNB4, and a single anchor UE 605 is illustrated. Although only one anchor UE 605 may be used in some instances, other instances may use two or more. Moreover, in some instances, anchor UEs 605 may comprise the only type of anchor point for positioning and/or gNBs not be used as anchor points. (Again, as used herein, the term "anchor point" refers to a device with a known location used to determine the location of the target UE 603.)

To determine the position of the target UE 603 (e.g., using any of the previously-described positioning techniques) the target UE 603 can take measurements of wireless signals sent from different anchor points: gNB1-gNB3 and anchor UE 605. As indicated in FIG. 4, the target UE 603 can communicate with and/or obtain measurements from gNB1-gNB3 using a Uu (network) interface 630. Measurements may be made from reference signals from the gNBs, such as PRS (e.g., DL-PRS). With regard to anchor UE 605, target UE 603 can communicate using SL interface 650. As previously noted, and SL interface 650 allows direct (D2D) communication between the target UE 603 and anchor UE 605, and may be used in a manner similar to the Uu interfaces 630, allowing the target UE 603 to obtain position-related measurements in relation to determining the location of the target UE 603. As such, the anchor UE 605 may be configured to provide a PRS (e.g., SL-PRS) and/or similar reference signal, which may be transmitted in a manner similar to a gNB. For its part, the anchor UE 605 may also communicate with the LMF 220 via gNB4 using a Uu interface 630. In this example, gNB4 may comprise the serving gNB for anchor UE 605.

The use of an anchor UE 605 in the positioning of the target UE 603 is similar to the use of base stations in FIGS. 3-5 for OTDOA, RTT, and AoD-based positioning. However, specific details regarding the use of an anchor UE 605 are yet undetermined. There are no definitions for SL-based assisted measurements in LPP reporting. And it is unclear what assistance data is needed by the target UE 603.

According to embodiments herein, the LMF 220, anchor UE 605, and/or a gNB can provide the target UE 603 with assistance data regarding the anchor UE 605 to enable the target UE 603 to take measurements needed for positioning determination (e.g., in accordance with OTDOA, RTT, and/or AOD-based positioning techniques).

Positioning data provided by the LMF 220 may include information from anchor points gNB1-gNB3 and anchor UE 605, and may be provided, for example, in an LPP positioning session between the LMF 220 and target UE 603. Assistance data from anchor points gNB1-gNB3 and anchor UE 605 additionally or alternatively may be provided directly to the target UE 603 via Uu interface(s) 630 and/or SL interface 650. In some embodiments, assistance information from the anchor UE 605 may be provided by the anchor UE 605 to a serving gNB (e.g., gNB4), which may provide the information (e.g., via an Xn interface 650 between gNBs of the NG-RAN 235 of FIG. 2) to a gNB in direct communication with the target UE 603, such as gNB1 (which may be the serving gNB to target UE 603). The gNB in direct communication with the target UE 603 can then provide the assistance data to the target UE 603 via a respective Uu interface 630.

For network-based (UE-assisted) positioning in which the network determines the location of the target UE 603, the UE can provide measurements to the LMF 220 (e.g., in an LPP report), enabling the LMF 220 to determine the location. For UE-based positioning, the target UE 603 can determine its own location based on the measurements. Assistance data may be provided to the target UE 603 in both network-based and UE-based positioning, although the content of the assistance data may vary depending on whether network-based positioning or UE-based positioning is being performed. According to embodiments, the type of information provided in the assistance data to the target UE 603 for positioning based on one or more anchor UEs 605 may include one or more of the following types of information.

The coordinates of the anchor UE 605, for example, can be included in assistance data to the target UE 603 for UE-based positioning. Unlike gNBs, which may have known locations stored in an almanac accessible to the LMF 220 and/or target UE 603, the anchor UE 605 may be mobile (e.g., a mobile phone, vehicle, etc.), with no predetermined position. However, positioning techniques, such as the techniques described herein, GNSS-based positioning, or the like, can be used to determine the coordinates of the anchor UE 605. Thus, for example, the LMF 220 or target UE 603 may determine the coordinates of the anchor UE 605 by calculating the coordinates from location-related measurements (e.g., OTDOA, RTT, etc.) obtained by the anchor UE 605 and sent to the LMF 220 (e.g., in a positioning session for the anchor UE 605) or target UE 603, and/or the coordinates may be sent to the LMF 220 or target UE 603 directly from the anchor UE 605. Where multiple measurements are made by the target UE 603 of signals sent from the anchor UE 605, multiple respective coordinates of the anchor UE 605 can be provided in the assistance data (e.g., in multiple messages comprising assistance data), which may be based on whether the anchor UE 605 is moving. An approximate location of the anchor UE 605 may be known by the LMF 220 from, for example, a previous positioning session for the anchor UE 605, and the anchor UE 605 may be selected to be an anchor for the positioning of the target UE 603 based on the approximate location being within a threshold distance of and approximate location of the target UE 603 (in addition to SL positioning capabilities of the anchor UE 605). The coordinates may be actual or estimated coordinates of the anchor UE 605 at the time the anchor UE 605 transmits a reference signal (e.g., SL-PRS).

The coordinates of the anchor UE 605 may, in some embodiments, include an uncertainty value related to the coordinates. That is, based on the type of positioning used to determine the coordinates of the anchor UE 605, any detected movement of the anchor UE 605 (e.g., using motion sensors or other information of the anchor UE 605), and/or other factors that could impact the accuracy of the coordinates, and uncertainty value can be determined for the coordinates. This uncertainty value may provide, for example, an error margin for the coordinates (e.g., ±X meters, centimeters, etc.). When determining the location of the target UE 603, this uncertainty value can help in weighting measurements obtained between the target UE 603 and anchor UE 605. That is, less uncertainty can result in giving the measurements more weight, while more uncertainty can result in giving the measurements little or no weight.

Other details that may impact the accuracy of the coordinates additionally or alternatively may be provided Details may additionally or alternatively include kinematic constraints, such as a velocity or other movement-related information of the anchor UE 605, the movement related info maybe is related to UE-105 (say target UE 603 and 605 are moving together, although the location of UE 605 is not known, the known constraint could provide additional information for positioning) which can be helpful in determining the reliability of one or more measurements made by the target UE 603 of one or more reference signals transmitted by the anchor UE 605.

Another type of information that can be included in assistance data to the target UE 603, is height of the anchor UE 605. In some instances, this comprise a predetermined or fixed height of a transmission point of the anchor UE 605, such as when the anchor UE 605 comprises a vehicle with a panel/antenna at a fixed height on the vehicle. In other instances, this may comprise a measured height of the anchor UE 605. If, for example, the anchor UE 605 comprises a mobile phone, the mobile phone maybe capable of determining its height using a GNSS receiver, altimeter, barometer, camera(s), etc. The height information provided in this assistance data can include the actual height (e.g., measured or predetermined/fixed) and/or raw measurements (e.g., GNSS measurements, sensor measurements, etc.) from which height may be determined.

Another type of information that assistance data may include comprises drift rate of the anchor UE 605 and/or Relative Time Difference (RTD) of the anchor UE 605 relative to anchor points (e.g., other anchor UEs or gNBs). (The RTD between node i and node j, is defined as tj-ti, where ti and tj are defined as the time when node i and node j transmit the start of one subframe respectively.) Similar to positioning using Uu interfaces 630, positioning using SL interface 650 may involve providing the drift rate of a reference signal source (anchor UE 605) or RTD of multiple anchor points. The anchor UE 605, however, may have a clock drift higher than that of a gNB. As such, including drift rate of the anchor UE 605 and/or RTD of the anchor UE 605 relative to anchor points in assistance data may be especially helpful to ensure accuracy of measurements of reference signals measured by the target UE 603 transmitted by the anchor UE 605. Drift rate provided may also include related information, such as a timing advance (TA).

For instances in which AOD-based positioning is performed, assistance data may also include the beam angles/shapes of the anchor UE 605. That is, in addition to beam angles/shape information for reference signals transmitted by gNB1-3, the LMF also may provide beam angle/shape information for reference signals transmitted by the anchor UE 605. Beam angle and shape may vary, depending on carrier frequency, antenna design, and the like. For example, the varying frequencies that wideband systems may use, beams may be subject to "beam squint" in which the beam azimuth and/or elevation angle and gain changes with the use of different frequencies. This frequency dependence can be based on the particular physical characteristics and codeword used by the transmitting antenna array. Thus, providing information regarding frequency dependence and antenna design, for example, can be particularly helpful in position determination of the target UE 603. Unlike gNB1-3, however, anchor UE 605 comprise a mobile device. And thus, information regarding the orientation of the anchor UE 605 may be particularly helpful in conjunction with beam angle/shape. Accordingly, embodiments may include orientation information along with beam angle/shape, the latter of which may include frequency-dependent information (e.g., to accommodate beam squinting).

For instances in which RTT-based or (optionally) OTDOA-based positioning is performed, assistance data may also include group-delay calibration information regarding the anchor UE 605. Group delay is a delay in signals transmitted by a device (e.g., anchor UE 605) caused by RF components. Group-delay calibration information can relay information regarding this delay, enabling the target UE 603 to account for the group delay when taking a TOA measurement of a reference signal. Group delay can be especially impactful for RTT measurements although it may impact OTDOA measurements as well. Thus, accounting for group delay can increase the accuracy of the position determination for the target UE 603 based on such measurements.

According to some embodiments, information regarding group delay and/or calibration error can be provided using a "timing error group." A timing error group is a way in which measurements and/or signals having the same group delay and/or calibration error (e.g., by using the same antenna, antenna panel, and/or beam) may be grouped together in a common timing error group, thereby allowing a device to convey this timing error information more efficiently, indicating the group to which this timing error information applies, rather than specifying group delay and/or calibration error for each measurement/signal. With respect to signals, a transmitting device (e.g., anchor UE 605) may indicate all signals belonging to it timing error group may have a common Tx group delay, for example, and/or a receiving device may use a timing error group to indicate all signals received in a certain beam have a common Rx group delay. With regard to measurements, a timing error group may apply to Rx, Tx, and/or combined Rx-Tx measurements. For RTT measurements, for example, the timing error group may be used to indicate which RTT measurements have a common combine Rx-Tx group delay. Thus, a timing error group may be included in assistance information to efficiently convey group delay and/or calibration error that applies to one or more measurements, signals, and/or beams to a receiving device, allowing the receiving device to compensate for these errors when determining a position of the target UE 603.

The use of assistance information for SL-assisted positioning using the techniques herein may be similar to the use of assistance information in traditional LPP sessions. That is, the general procedure for LPP sessions may comprise establishing the LPP session, exchanging positioning capabilities (e.g., using RequestCapabilities and ProvideCapabilities information elements (IEs)), transferring assistance data (e.g., using RequestAssistanceData and ProvideAssistanceData IEs), and transferring location information (e.g., positioning measurements and/or position estimates via RequestLocationInformation and ProvideLocationInformation IEs). As an example, assistance information for SL-assisted positioning as described herein may involve the LMF 220 starting an LPP or NRPPa session with the anchor UE 605. The protocol may depend on whether the anchor UE 605 is operating in transparent mode (in which case it may use either LPP or NRPPa) or advanced mode (in which case it may use LPP). The target UE 603 can then report the assistance data to the LMF 220, per request.

Figure 7:
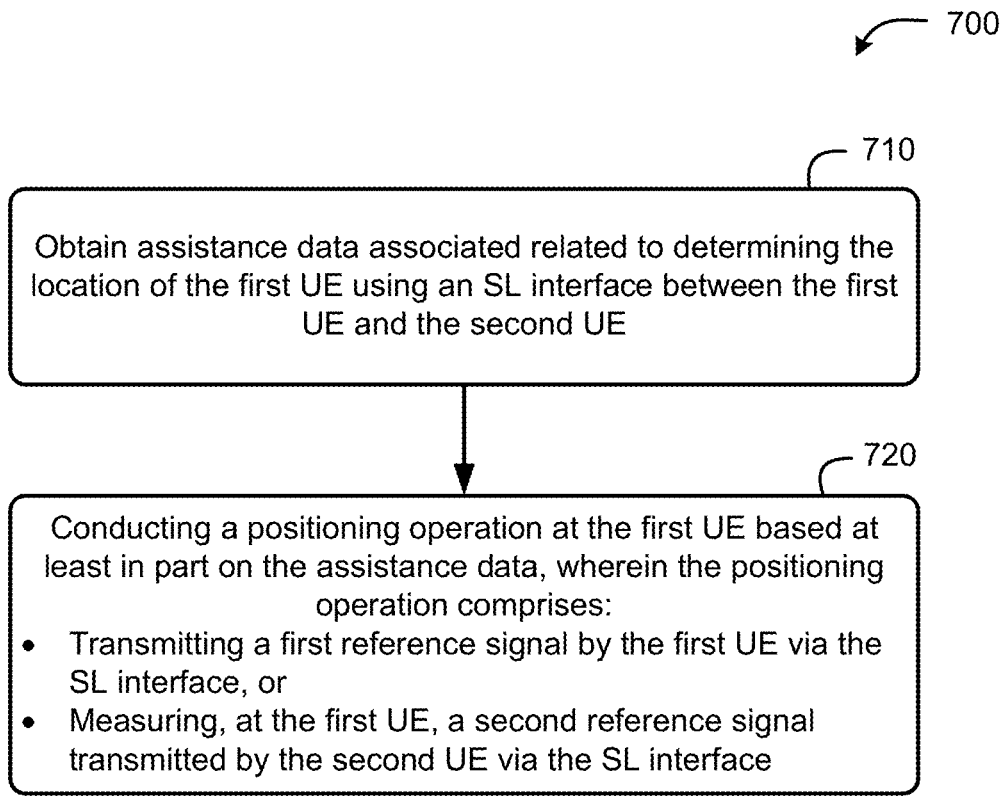
FIG. 7 is a flow diagram of determining a location of a first UE using assistance data related to a second UE, according to an embodiment.

FIG. 7 is a flow diagram of method 700 of determining a location of a first UE using assistance data related to a second UE, according to an embodiment. In some aspects the method 700, describes a method performed by a first UE, corresponding to the target UE 603 as previously described in relation to FIG. 6. Alternative embodiments may perform the functions in different order, in parallel, and/or may otherwise rearrange the flow of functions illustrated in FIG. 7. Means for performing the functionality illustrated in the blocks shown in FIG. 7 may be performed by hardware and/or software components of a UE. Example components of a UE are illustrated FIG. 8, which are described in more detail below.

At block 710, the functionality comprises obtaining assistance data related to determining the location of the first UE using an SL interface between the first UE and the second UE. As noted, the first UE may obtain the assistance data directly from the second UE via an SL interface, from the location server (e.g., in an LPP positioning session), and/or from a gNB via a Uu interface. As indicated in the above-described embodiments, the content of the assistance data may vary, depending on the type of positioning method used (e.g., OTDOA, RTT, or AOD), whether the first UE is going to transmit and/or measure a PRS via the SL interface, and whether the first UE is going to calculate its location (e.g., for UE-based positioning) or provide measurements to a location server or base station (e.g., for network-based positioning). In some embodiments, the assistance data includes coordinates of the second UE, and the location of the first UE is additionally based at least in part on the coordinates of the second UE. In such cases, additional information may comprise an uncertainty value related to the coordinates, information regarding which panel, beam, or antenna of the second UE is used to transmit the PRS, or kinematic constraints related to the second UE's transmission of the PRS, or any combination thereof. According to some embodiments assistance data includes information indicative of a height of the second UE. As noted, this information indicative of the height may be an actual height (measured or predetermined) and/or measurement data (e.g., data from sensors of the second UE) from which a height of the second UE may be determined. According to some embodiments, the assistance data includes information indicative of a drift rate of the second UE. According to some embodiments, the assistance data includes information indicative of a beam characteristic used by the second UE to transmit the PRS, wherein the beam characteristic comprises a beam shape, angle, or both. According to some embodiments, assistance data may also include a frequency dependence of the beam characteristic, to account for beams squint. According to some embodiments, the assistance data includes information indicative a group delay of the second UE. The group delay may comprise an Rx group delay, Tx group delay, or a combined Rx-Tx group delay, which may depend on the type of measurement made (e.g., OTDOA, RTT, etc.). As previously noted, group delay and/or calibration error may be conveyed using a timing error group.

Figure 8:
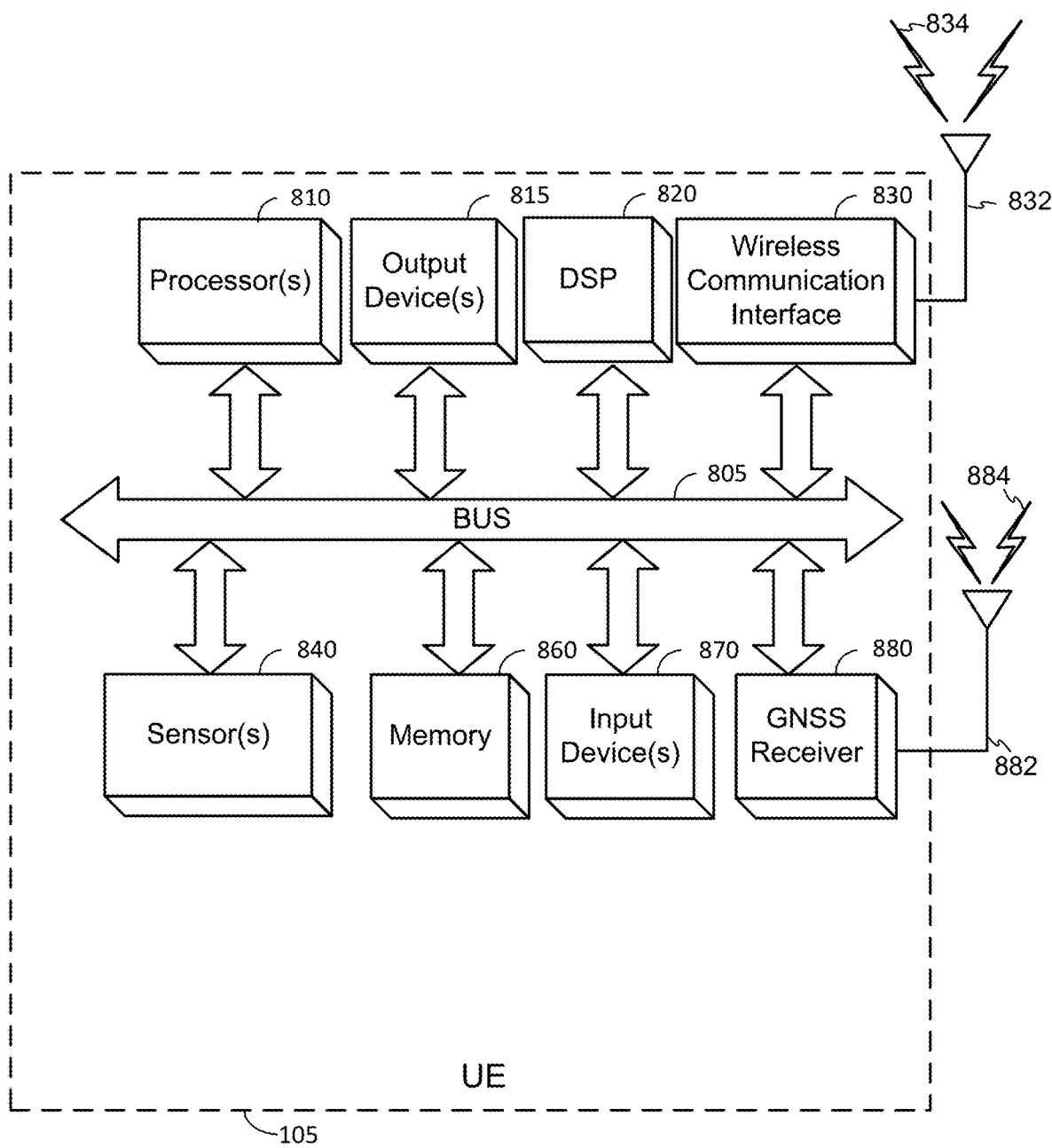
FIG. 8 illustrates an embodiment of a UE, which can be utilized in embodiments as described herein.

Means for performing functionality at block 710 may comprise a wireless communication interface 830, bus 805, memory 860, processor(s) 810, digital signal processor (DSP) 820, and/or other components of a UE, such as the UE 105 as illustrated in FIG. 8 and described in more detail below.

At block 720, the functionality comprises conducting a positioning operation at the first UE based at least in part on the assistance data, where in the positioning operation comprises transmitting a first positioning signal by the first UE via the SL interface, or measuring, at the first UE, a second positioning signal transmitted by the second UE via the SL interface. According to some embodiments, the first positioning signal, the second positioning signal, or both, may comprise an SL-PRS. Alternative embodiments may utilize other types of positioning signals sent via the SL interface. According to some embodiments, determining when to measure the first positioning signal, or when to transmit the seconds positioning signal, as the case may be, may be based at least in part on the assistance data. That is, the assistance data may include various parameters (e.g., carrier frequency, schedule, etc.) to enable measurement of the reference signal. Additionally or alternatively, the assistance data may include parameters to indicate how to transmit the second positioning signal. Means for performing functionality at block 720 may comprise a wireless communication interface 830, bus 805, memory 860, processor(s) 810, DSP 820, and/or other components of a UE, such as the UE 105 as illustrated in FIG. 8 and described in more detail below.

As noted, techniques herein may be used for both UE-assisted and UE-based positioning. Accordingly, according to some embodiments in which the first UE measures the second positioning signal transmitted by the second UE, the method 700 may further comprise performing either or both of (i) sending information indicative of the measurement to a location server, wherein taking the measurement was based at least in part on the assistance data, or (ii) determining the location of the first UE based at least in part on the measurement and the assistance data. With regard to (i), as previously noted, timing frequency and/or other parameters of the reference signal may be provided in assistance data, enabling the measurement of the reference signal. With regard to (ii), the assistance data may further comprise location information (e.g., coordinates) and/or other information to enable the first UE to determine its location based on the information in addition to the measurement.

As previously noted, embodiments may include additional functions, depending on desired functionality. As discussed with regard to the example illustrated in FIG. 6, for example, multiple measurements from multiple positioning signals (e.g., multiple PRSs) may be made. These positioning signals may be based on different types of anchor points, including base stations (e.g., gNBs) as well as other UEs. As such, according to some embodiments, the method 700 may further comprise taking a measurement of each of one or more additional positioning signals. According to some embodiments, the method 700 may further comprise sending information indicative of the one or more measurements to the location server. Additionally or alternatively, determining the location of the first UE is additionally based at least in part on the one or more measurements. These one or more additional positioning signals may comprise one or more DL-PRS from one or more base stations or may comprise positioning signals (e.g., SL-PRSs) transmitted by one or more additional UEs. The location of the UE may be determined using any of a variety of techniques. As such, according to some embodiments, determining the location of the first UE may comprise using an OTDOA-based positioning method, and AOD-based positioning method, or an RTT-based positioning method, or any combination thereof.

Other methods of determining a location of a first UE using assistance data related to a second UE, according to some embodiments, may include the functionality of the second UE or a location server.

For example, according to some embodiments, a second UE may send assistance data to either a location server or the first UE and provide the second positioning signal to the first UE via an SL interface. In some embodiments, the second UE may send the assistance data to the first UE via the SL interface. The assistance data may include coordinates of the second UE, and may further include an uncertainty value related to the coordinates, information regarding which panel, beam, or antenna of the second UE is used to transmit the PRS, or kinematic constraints related to the second UE's transmission of the PRS, or any combination thereof. Additionally or alternatively, the assistance data may include information indicative of a height of the second UE (in which case the second UE may measure the height using sensors), a drift rate and/or RTD of the second UE, a beam characteristic used by the second UE to transmit the second positioning signal (in which case the beam characteristic may comprise a beam shape, angle, or both, and optionally a frequency dependence of the beam shape and/or angle), a group delay (e.g., which may be conveyed via a timing error group), or any combination thereof.

According to some embodiments, a location server may send assistance data to a first UE based on information obtained from a second UE. The assistance data may include coordinates of the second UE, and may further include an uncertainty value related to the coordinates, information regarding which panel, beam, or antenna of the second UE is used to transmit the second positioning signal, or kinematic constraints related to the second UE's transmission of the second positioning signal, or any combination thereof. Additionally or alternatively, the assistance data may include information indicative of a height of the second UE, a drift rate of the second UE, a beam characteristic used by the second UE to transmit the second positioning signal (in which case the beam characteristic may comprise a beam shape, angle, or both), a group delay, or any combination thereof. In some embodiments, the location server may provide the first UE with the assistance data in an LPP positioning session.

FIG. 8 illustrates an embodiment of a UE 105, which can be utilized as described herein above (e.g., in association with FIGS. 1-7). For example, the UE 105 can perform one or more of the functions of the method shown in FIG. 7. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 8.

The UE 105 is shown comprising hardware elements that can be electrically coupled via a bus 805 (or may otherwise be in communication, as appropriate). The hardware elements may include a processor(s) 810 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 810 may comprise one or more processing units, which may be housed in a single integrated circuit (IC) or multiple ICs. As shown in FIG. 8, some embodiments may have a separate DSP 820, depending on desired functionality. Location determination and/or other determinations based on wireless communication may be provided in the processor(s) 810 and/or wireless communication interface 830 (discussed below). The UE 105 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The UE 105 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 830 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 840. Sensor(s) 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 810 or DSP 820.

The UE 105 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 105 (and/or processor(s) 810 or DSP 820 within UE 105). In some embodiments, then, such code and/or instructions can be used to configure and/or adapt a general-purpose computer (or other device) to perform one or more operations in accordance with the described methods.

Figure 9:
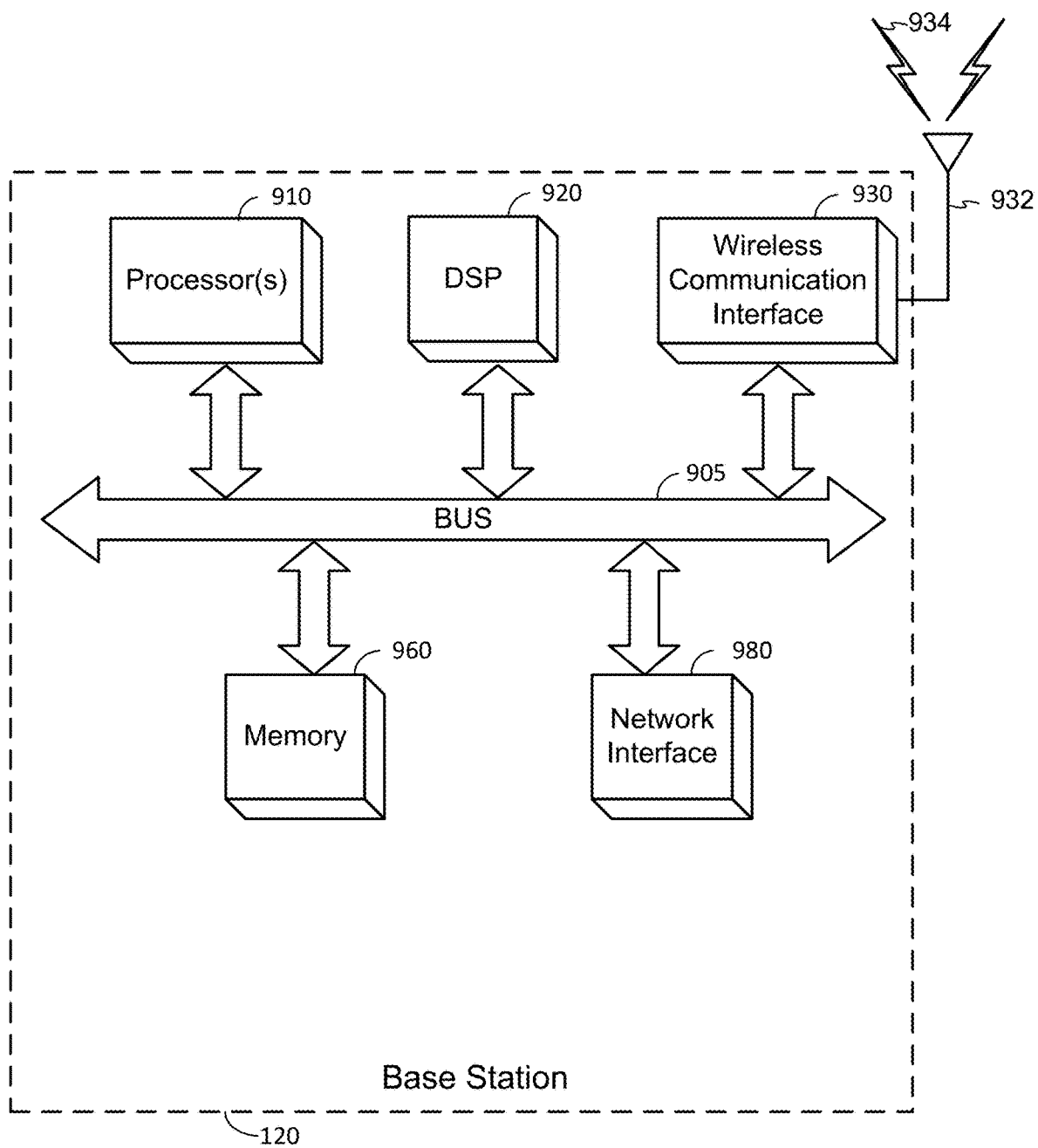
FIG. 9 illustrates an embodiment of a base station, which can be utilized in embodiments as described herein.

FIG. 9 illustrates an embodiment of a base station 120, which can be utilized as described herein above (e.g., in association with FIGS. 1-8). It should be noted that FIG. 9 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 905 (or may otherwise be in communication, as appropriate). The hardware elements may include a processor(s) 910 which can include without limitation one or more general-purpose processors, one or more special-purpose processors (such as DSP chips, graphics acceleration processors, ASICs, and/or the like), and/or other processing structure or means. As shown in FIG. 9, some embodiments may have a separate DSP 920, depending on desired functionality. Location determination and/or other determinations based on wireless communication may be provided in the processor(s) 910 and/or wireless communication interface 930 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 930 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 932 that send and/or receive wireless signals 934.

The base station 120 may also include a network interface 980, which can include support of wireline communication technologies. The network interface 980 may include a modem, network card, chipset, and/or the like. The network interface 980 may include one or more input and/or output communication interfaces to permit data to be exchanged with a network, communication network servers, computer systems, and/or any other electronic devices described herein.

In many embodiments, the base station 120 may further comprise a memory 960. The memory 960 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 960 of the base station 120 also may comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the base station 120 (and/or processor(s) 910 or DSP 920 within base station 120). In some embodiments, then, such code and/or instructions can be used to configure and/or adapt a general-purpose computer (or other device) to perform one or more operations in accordance with the described methods.

Figure 10:
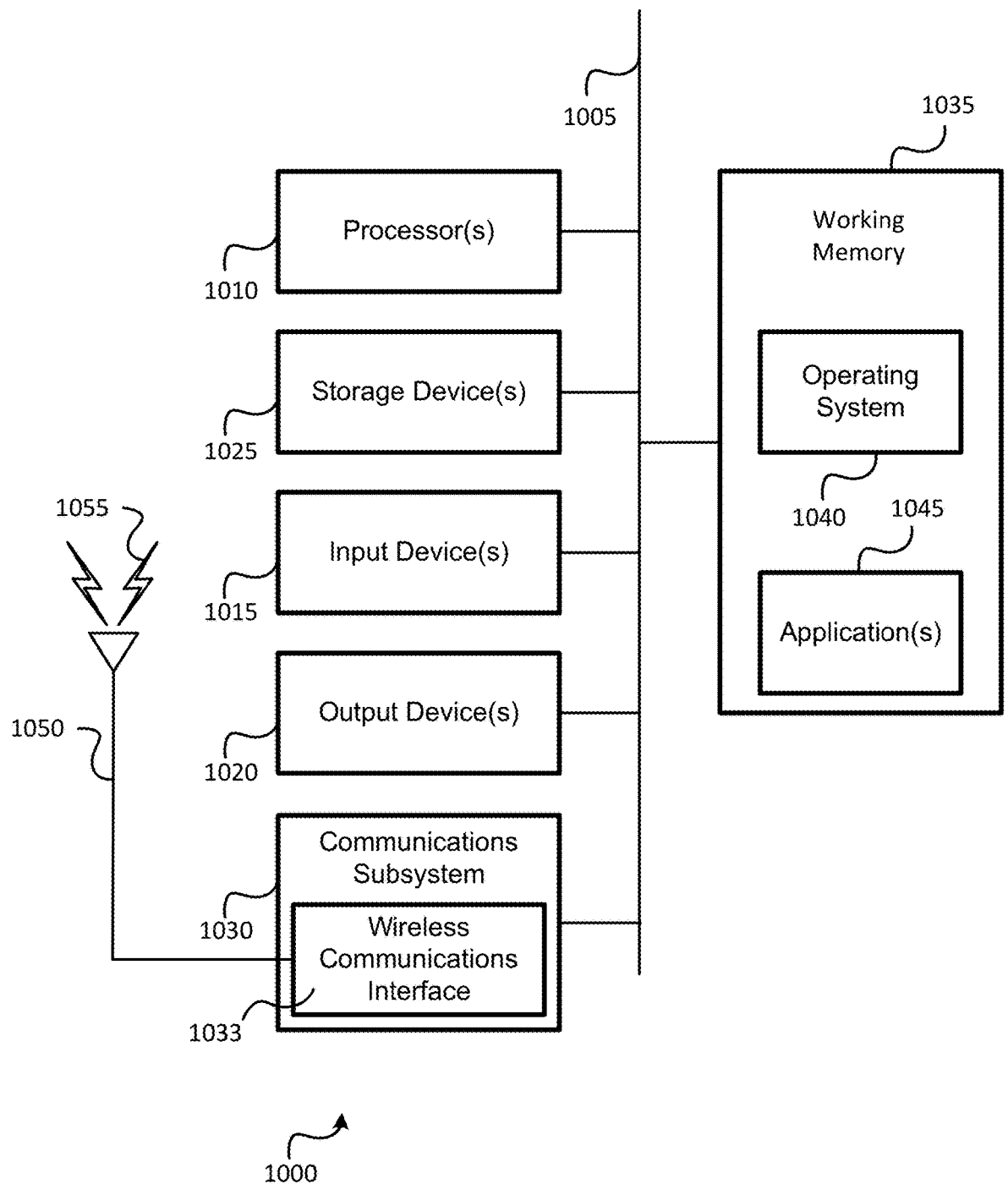
FIG. 10 is a block diagram of an embodiment of a computer system, which can be utilized in embodiments as described herein.

FIG. 10 is a block diagram of an embodiment of a computer system 1000, which may be used, in whole or in part, to provide the functions of one or more network components as described in the embodiments herein (e.g., location server 160 of FIG. 1 or LMF 220 of FIGS. 2 and 6). It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different geographical locations.

The computer system 1000 is shown comprising hardware elements that can be electrically coupled via a bus 1005 (or may otherwise be in communication, as appropriate). The hardware elements may include processor(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The wireless communication interface 1033 may comprise one or more wireless transceivers may send and receive wireless signals 1055 (e.g., signals according to 5G NR or LTE) via wireless antenna(s) 1050. Thus the communications subsystem 1030 may comprise a modem, a network card (wireless or wired), an infrared communication device, a wireless communication device, and/or a chipset, and/or the like, which may enable the computer system 1000 to communicate on any or all of the communication networks described herein to any device on the respective network, including a User Equipment (UE), base stations and/or other TRPs, and/or any other electronic devices described herein. Hence, the communications subsystem 1030 may be used to receive and send data as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1. A method of determining a location of a first user equipment (UE) using assistance data related to a second UE, the method comprising: obtaining assistance data related to determining the location of the first UE using a sidelink (SL) interface between the first UE and the second UE; and conducting a positioning operation at the first UE based at least in part on the assistance data, wherein the positioning operation comprises: transmitting a first positioning signal by the first UE via the SL interface, or performing, at the first UE, a measurement of a second positioning signal transmitted by the second UE via the SL interface.

Clause 2. The method of clause 1, wherein the first positioning signal, the second positioning signal, or both, comprise a Sidelink Positioning Reference Signal (SL-PRS).

Clause 3. The method of any of clauses 1-2 wherein the first UE performs the measurement of the second positioning signal, the method further comprising performing either or both of: (i) sending information indicative of the measurement to a location server, wherein taking the measurement was based at least in part on the assistance data; or (ii) determining the location of the first UE based at least in part on the measurement and the assistance data.

Clause 4. The method of clause 3 wherein determining the location of the first UE comprises using: an Observed Time Difference Of Arrival (OTDOA)-based positioning method, an Angle Of Departure (AOD)-based positioning method, or a Round Trip Time (RTT)-based positioning method, or any combination thereof.

Clause 5. The method of any of clauses 1-4 wherein the assistance data includes coordinates of the second UE.

Clause 6. The method of clause 5 further comprising obtaining additional information related to the coordinates, wherein the additional information comprises: an uncertainty value related to the coordinates; information regarding which panel, beam, or antenna of the second UE is used to transmit the second positioning signal; or kinematic constraints related to the second UE's transmission of the second positioning signal; or any combination thereof.

Clause 7. The method of any of clauses 1-6 wherein the assistance data includes: information indicative of a height of the second UE; information indicative of a drift rate, Relative Time Difference (RTD), or both of the second UE; information indicative of a beam characteristic used by the second UE to transmit the second positioning signal, wherein the beam characteristic comprises a beam shape, angle, or both; information indicative of a frequency dependence of the beam characteristic; or information indicative a group delay of the second UE; or any combination thereof.

Clause 8. The method of any of clauses 1-7 further comprising performing one or more measurements comprising a measurement of each of one or more additional positioning signals.

Clause 9. The method of clause 8 further comprising sending information indicative of the one or more measurements to a location server.

Clause 10. The method of any of clauses 8-9 wherein determining the location of the first UE is additionally based at least in part on the one or more measurements.

Clause 11. The method of any of clauses 8-10 wherein the one or more additional positioning signals comprise one or more DL-positioning signals from one or more base stations.

Clause 12. The method of any of clauses 8-10 wherein the one or more additional positioning signals are transmitted by one or more additional UEs.

Clause 13. The method of any of clauses 1-12 wherein the assistance data is obtained by the first UE from a location server.

Clause 14. The method of any of clauses 1-12 wherein the assistance data is obtained by the first UE from the second UE via the SL interface.

Clause 15. A first user equipment (UE) for determining a location of the first UE a using assistance data related to a second UE, the first UE comprising: a transceiver; a memory; and one or more processors communicatively coupled with the transceiver and the memory, wherein the one or more processors are configured to: obtain the assistance data related to determining the location of the first UE using a sidelink (SL) interface between the first UE and the second UE; and conduct a positioning operation at the first UE based at least in part on the assistance data, wherein the positioning operation comprises: transmitting, with the transceiver, a first positioning signal by the first UE via the SL interface, or performing, with the transceiver, a measurement of a second positioning signal transmitted by the second UE via the SL interface.

Clause 16. The first UE of clause 15, wherein the one or more processors are configured to conduct the positioning operation in which the first positioning signal, the second positioning signal, or both, comprise a Sidelink Positioning Reference Signal (SL-PRS).

Clause 17. The first UE of any of clauses 15-16 wherein the one or more processors are configured to, after performing the measurement of the second positioning signal, perform either or both of: (i) sending information indicative of the measurement to a location server, wherein taking the measurement was based at least in part on the assistance data; or (ii) determining the location of the first UE based at least in part on the measurement and the assistance data.

Clause 18. The first UE of any of clauses 15-17 wherein, to determine the location of the first UE, the one or more processors are configured to use an Observed Time Difference Of Arrival (OTDOA)-based positioning method, an Angle Of Departure (AOD)-based positioning method, or a Round Trip Time (RTT)-based positioning method, or any combination thereof.

Clause 19. The first UE of any of clauses 15-18 wherein, to obtain the assistance data, the one or more processors are configured to obtain data including coordinates of the second UE.

Clause 20. The first UE of any of clauses 15-19 wherein the one or more processors are further configured to obtain additional information related to the coordinates, wherein the additional information comprises: an uncertainty value related to the coordinates; information regarding which panel, beam, or antenna of the second UE is used to transmit the second positioning signal; or kinematic constraints related to the second UE's transmission of the second positioning signal; or any combination thereof.

Clause 21. The first UE of any of clauses 15-20 wherein, to obtain the assistance data, the one or more processors are configured to obtain information indicative of a height of the second UE; information indicative of a drift rate, Relative Time Difference (RTD), or both of the second UE; information indicative of a beam characteristic used by the second UE to transmit the second positioning signal, wherein the beam characteristic comprises a beam shape, angle, or both; information indicative of a frequency dependence of the beam characteristic; or information indicative a group delay of the second UE; or any combination thereof.

Clause 22. The first UE of any of clauses 15-21 wherein the one or more processors are further configured to perform one or more measurements comprising a measurement of each of one or more additional positioning signals.

Clause 23. The first UE of any of clauses 15-22 wherein the one or more processors are further configured to send information indicative of the one or more measurements to a location server.

Clause 24. The first UE of any of clauses 15-23 wherein the one or more processors are configured to determine the location of the first UE additionally based at least in part on the one or more measurements.

Clause 25. The first UE of any of clauses 15-24 wherein, to perform the one or more measurements comprising the measurement of each of the one or more additional positioning signals, the one or more processors are configured to perform a measurement of one or more DL-positioning signals from one or more base stations.

Clause 26. The first UE of any of clauses 15-25 wherein, to perform the one or more measurements comprising the measurement of each of the one or more additional positioning signals, the one or more processors are configured to measure the one or more additional positioning signals transmitted by one or more additional UEs.

Clause 27. The first UE of any of clauses 15-26 wherein the one or more processors are configured to obtain the assistance data from a location server.

Clause 28. The first UE of any of clauses 15-27 wherein the one or more processors are configured to obtain the assistance data from the second UE via the SL interface.

Clause 29. An apparatus for determining a location of a first user equipment (UE) using assistance data related to a second UE, the apparatus comprising: means for obtaining assistance data related to determining the location of the first UE using a sidelink (SL) interface between the first UE and the second UE; and means for conducting a positioning operation at the first UE based at least in part on the assistance data, wherein the positioning operation comprises: means for transmitting a first positioning signal by the first UE via the SL interface, or means for performing, at the first UE, a measurement of a second positioning signal transmitted by the second UE via the SL interface.

Clause 30. The apparatus of clause 29, further comprising means for performing either or both of: (i) sending information indicative of the measurement to a location server, wherein taking the measurement was based at least in part on the assistance data; or (ii) determining the location of the first UE based at least in part on the measurement and the assistance data.

Clause 31. The apparatus of any of clauses 29-30 wherein the means for performing the determining the location of the first UE comprises means for using: an Observed Time Difference Of Arrival (OTDOA)-based positioning method, an Angle Of Departure (AOD)-based positioning method, or a Round Trip Time (RTT)-based positioning method, or any combination thereof.

Clause 32. The apparatus of any of clauses 29-31 wherein the means for obtaining the assistance data includes means for obtaining coordinates of the second UE.

Clause 33. The apparatus of any of clauses 29-32 wherein the means for obtaining the assistance data includes means for obtaining: information indicative of a height of the second UE; information indicative of a drift rate, Relative Time Difference (RTD), or both of the second UE; information indicative of a beam characteristic used by the second UE to transmit the second positioning signal, wherein the beam characteristic comprises a beam shape, angle, or both; information indicative of a frequency dependence of the beam characteristic; or information indicative a group delay of the second UE; or any combination thereof.

Clause 34. The apparatus of any of clauses 29-33 further comprising means for performing one or more measurements comprising a measurement of each of one or more additional positioning signals.

Clause 35. A non-transitory computer-readable medium storing instructions for determining a location of a first user equipment (UE) using assistance data related to a second UE, the instructions comprising code for: obtaining assistance data related to determining the location of the first UE using a sidelink (SL) interface between the first UE and the second UE; and conducting a positioning operation at the first UE based at least in part on the assistance data, wherein the positioning operation comprises: transmitting a first positioning signal by the first UE via the SL interface, or performing, at the first UE, a measurement of a second positioning signal transmitted by the second UE via the SL interface.

What is claimed is:

1. A method of determining a location of a first user equipment (UE) using assistance data related to a second UE, the method comprising:
    obtaining, at the first UE, assistance data related to determining the location of the first UE using a sidelink (SL) interface between the first UE and the second UE, wherein the assistance data includes coordinates of the second UE and wherein the assistance data further includes information indicative of an item from a first group of items comprising:
        a height of the second UE;
        a drift rate, Relative Time Difference (RTD), or both of the second UE;
        a beam characteristic used by the second UE to transmit a positioning signal, wherein the beam characteristic comprises a beam shape, angle, or both;
        a frequency dependence of the beam characteristic;
        a group delay of the second UE; or
        any combination of two or more items from the first group of items;
    obtaining, at the first UE, additional information related to the coordinates, wherein the additional information comprises an item from a second group of items comprising:
        an error margin for the coordinates;
        information regarding which panel, beam, or antenna of the second UE is used to transmit the positioning signal;

kinematic constraints, including movement-related information of the second UE, related to transmission of the positioning signal by the second UE; or any combination of two or more items from the second group of items; and conducting a positioning operation at the first UE for determining the location of the first UE, based at least in part on the assistance data and the additional information, wherein the positioning operation comprises performing, at the first UE, a measurement of the positioning signal transmitted by the second UE via the SL interface.

2. The method of claim 1, wherein the positioning signal comprises a Sidelink Positioning Reference Signal (SL-PRS).

3. The method of claim 1, the method further comprising performing either or both of:
(i) sending information indicative of the measurement to a location server; or
(ii) determining the location of the first UE based at least in part on the measurement and the assistance data.

4. The method of claim 3, wherein determining the location of the first UE comprises using an item from a third group of items comprising:
an Observed Time Difference Of Arrival (OTDOA)-based positioning method,
an Angle Of Departure (AOD)-based positioning method, or
a Round Trip Time (RTT)-based positioning method, or
any combination of two or more items from the third group of items.

5. The method of claim 1, further comprising performing one or more measurements comprising a measurement of each of one or more additional positioning signals.

6. The method of claim 5, further comprising sending information indicative of the one or more measurements to a location server.

7. The method of claim 5, wherein determining the location of the first UE is additionally based at least in part on the one or more measurements.

8. The method of claim 5, wherein the one or more additional positioning signals comprise one or more DL-positioning signals from one or more base stations.

9. The method of claim 5, wherein the one or more additional positioning signals are transmitted by one or more additional UEs.

10. The method of claim 1, wherein the assistance data is obtained by the first UE from a location server.

11. The method of claim 1, wherein the assistance data is obtained by the first UE from the second UE via the SL interface.

12. A first user equipment (UE) for determining a location of the first UE a using assistance data related to a second UE, the first UE comprising:
a transceiver;
a memory; and
one or more processors communicatively coupled with the transceiver and the memory, wherein the one or more processors are configured to:
obtain the assistance data related to determining the location of the first UE using a sidelink (SL) interface between the first UE and the second UE, wherein the assistance data includes coordinates of the second UE and wherein the assistance data further includes information indicative of an item from a first group of items comprising:
a height of the second UE;
a drift rate, Relative Time Difference (RTD), or both of the second UE;
a beam characteristic used by the second UE to transmit a positioning signal, wherein the beam characteristic comprises a beam shape, angle, or both;
a frequency dependence of the beam characteristic;
a group delay of the second UE; or
any combination of two or more items from the first group of items;
obtain additional information related to the coordinates, wherein the additional information comprises an item from a second group of items comprising:
an error margin for the coordinates;
information regarding which panel, beam, or antenna of the second UE is used to transmit the positioning signal;
kinematic constraints, including movement-related information of the second UE, related to transmission of the positioning signal by the second UE; or
any combination of two or more items from the second group of items; and
conduct a positioning operation at the first UE for determining the location of the first UE, based at least in part on the assistance data and the additional information, wherein the positioning operation comprises: performing, with the transceiver, a measurement of the positioning signal transmitted by the second UE via the SL interface.

13. The first UE of claim 12, wherein the one or more processors are configured to conduct the positioning operation in which the positioning signal comprises a Sidelink Positioning Reference Signal (SL-PRS).

14. The first UE of claim 12, wherein the one or more processors are configured to, after performing the measurement of the positioning signal, perform either or both of:
(i) sending information indicative of the measurement to a location server; or
(ii) determining the location of the first UE based at least in part on the measurement and the assistance data.

15. The first UE of claim 14, wherein, to determine the location of the first UE, the one or more processors are configured to use an item from a third group of items comprising:
an Observed Time Difference Of Arrival (OTDOA)-based positioning method,
an Angle Of Departure (AOD)-based positioning method, or
a Round Trip Time (RTT)-based positioning method, or
any combination of two or more items from the third group of items.

16. The first UE of claim 12, wherein the one or more processors are further configured to perform one or more measurements comprising a measurement of each of one or more additional positioning signals.

17. The first UE of claim 16, wherein the one or more processors are further configured to send information indicative of the one or more measurements to a location server.

18. The first UE of claim 16, wherein the one or more processors are configured to determine the location of the first UE additionally based at least in part on the one or more measurements.

19. The first UE of claim 16, wherein, to perform the one or more measurements comprising the measurement of each of the one or more additional positioning signals, the one or more processors are configured to perform a measurement of one or more DL-positioning signals from one or more base stations.

20. The first UE of claim 16, wherein, to perform the one or more measurements comprising the measurement of each of the one or more additional positioning signals, the one or more processors are configured to measure the one or more additional positioning signals transmitted by one or more additional UEs.

21. The first UE of claim 12, wherein the one or more processors are configured to obtain the assistance data from a location server.

22. The first UE of claim 12, wherein the one or more processors are configured to obtain the assistance data from the second UE via the SL interface.

23. An apparatus for determining a location of a first user equipment (UE) using assistance data related to a second UE, the apparatus comprising:
  means for obtaining assistance data related to determining the location of the first UE using a sidelink (SL) interface between the first UE and the second UE, wherein the assistance data includes coordinates of the second UE and wherein the assistance data further includes information indicative of an item from a first group of items comprising:
    a height of the second UE;
    a drift rate, Relative Time Difference (RTD), or both of the second UE;
    a beam characteristic used by the second UE to transmit a positioning signal, wherein the beam characteristic comprises a beam shape, angle, or both;
    a frequency dependence of the beam characteristic;
    a group delay of the second UE; or
    any combination of two or more items from the first group of items;
  means for obtaining additional information related to the coordinates, wherein the additional information comprises an item from a second group of items comprising:
    an error margin for the coordinates;
    information regarding which panel, beam, or antenna of the second UE is used to transmit the positioning signal;
    kinematic constraints, including movement-related information of the second UE, related to transmission of the positioning signal by the second UE; or
    any combination of two or more items from the second group of items; and
  means for conducting a positioning operation at the first UE for determining the location of the first UE, based at least in part on the assistance data and the additional information, wherein the positioning operation comprises performing, at the first UE, a measurement of the positioning signal transmitted by the second UE via the SL interface.

24. The apparatus of claim 23, further comprising means for performing either or both of:
  (i) sending information indicative of the measurement to a location server; or
  (ii) determining the location of the first UE based at least in part on the measurement and the assistance data.

25. The apparatus of claim 24, wherein the means for performing the determining the location of the first UE comprises means for using an item from a third group of items comprising:
  an Observed Time Difference Of Arrival (OTDOA)-based positioning method,
  an Angle Of Departure (AOD)-based positioning method, or
  a Round Trip Time (RTT)-based positioning method, or
  any combination of two or more items from the third group of items.

26. The apparatus of claim 23, further comprising means for performing one or more measurements comprising a measurement of each of one or more additional positioning signals.

27. A non-transitory computer-readable medium storing instructions for determining a location of a first user equipment (UE) using assistance data related to a second UE, the instructions comprising code for:
  obtaining assistance data related to determining the location of the first UE using a sidelink (SL) interface between the first UE and the second UE, wherein the assistance data includes coordinates of the second UE and wherein the assistance data further includes information indicative of an item from a first group of items comprising:
    a height of the second UE;
    a drift rate, Relative Time Difference (RTD), or both of the second UE;
    a beam characteristic used by the second UE to transmit a positioning signal, wherein the beam characteristic comprises a beam shape, angle, or both;
    a frequency dependence of the beam characteristic;
    a group delay of the second UE; or
    any combination of two or more items from the first group of items;
  obtaining, at the first UE, additional information related to the coordinates, wherein the additional information comprises an item from a second group of items comprising:
    an error margin for the coordinates;
    information regarding which panel, beam, or antenna of the second UE is used to transmit the positioning signal;
    kinematic constraints, including movement-related information of the second UE, related to transmission of the positioning signal by the second UE; or
    any combination of two or more items from the second group of items; and
  conducting a positioning operation at the first UE for determining the location of the first UE, based at least in part on the assistance data and the additional information, wherein the positioning operation comprises performing, at the first UE, a measurement of the positioning signal transmitted by the second UE via the SL interface.

28. The method of claim 1, wherein the additional information comprises the information regarding which panel, beam, or antenna of the second UE is used to transmit the positioning signal, and wherein the information regarding which panel, beam, or antenna of the second UE is used to transmit the positioning signal comprises a timing error group.

* * * * *